US008949816B2

(12) United States Patent
Goda

(10) Patent No.: US 8,949,816 B2
(45) Date of Patent: Feb. 3, 2015

(54) FIRMWARE UPDATING METHOD, IMAGE FORMING APPARATUS, AND STORAGE MEDIUM

(71) Applicant: Canon Kabushiki Kaisha, Tokyo (JP)

(72) Inventor: Keigo Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/907,211

(22) Filed: May 31, 2013

(65) Prior Publication Data

US 2013/0332914 A1 Dec. 12, 2013

(30) Foreign Application Priority Data

Jun. 12, 2012 (JP) ................................. 2012-132788

(51) Int. Cl.
 *G06F 9/44* (2006.01)
 *G06F 9/445* (2006.01)
(52) U.S. Cl.
 CPC ........................................ *G06F 8/65* (2013.01)
 USPC .......................................................... 717/168
(58) Field of Classification Search
 None
 See application file for complete search history.

(56) References Cited

U.S. PATENT DOCUMENTS

| 7,480,907 B1 * | 1/2009 | Marolia et al. ................. 717/174 |
| 7,904,895 B1 * | 3/2011 | Cassapakis et al. ........... 717/168 |
| 2003/0177323 A1 * | 9/2003 | Popp et al. ...................... 711/162 |
| 2005/0144613 A1 * | 6/2005 | Tseng ............................. 717/168 |
| 2006/0080650 A1 * | 4/2006 | Winters et al. ................. 717/168 |
| 2007/0055969 A1 * | 3/2007 | Yang .............................. 717/168 |
| 2007/0169098 A1 * | 7/2007 | Kikuchi ......................... 717/168 |
| 2008/0301663 A1 * | 12/2008 | Bahat et al. .................... 717/170 |
| 2009/0172273 A1 * | 7/2009 | Piszczek et al. .............. 711/114 |
| 2009/0320012 A1 * | 12/2009 | Lee et al. ....................... 717/168 |
| 2010/0262853 A1 | 10/2010 | Goda |
| 2010/0268899 A1 * | 10/2010 | Etoh et al. ..................... 711/154 |
| 2011/0131563 A1 * | 6/2011 | Ohama et al. ................. 717/168 |
| 2011/0307878 A1 * | 12/2011 | Brannock et al. ............. 717/169 |
| 2012/0166396 A1 * | 6/2012 | Yamagami .................... 707/676 |
| 2012/0260244 A1 * | 10/2012 | Keller et al. .................. 717/173 |
| 2013/0125107 A1 * | 5/2013 | Bandakka et al. ............ 717/171 |
| 2013/0139139 A1 * | 5/2013 | Mallur et al. ................. 717/170 |
| 2013/0290946 A1 * | 10/2013 | Iwadate ......................... 717/168 |

FOREIGN PATENT DOCUMENTS

JP 2004-318871 A 11/2004

OTHER PUBLICATIONS

Belyeu, "Journaling Bits a Look at the OS X Personal Diary", 2005.*

* cited by examiner

*Primary Examiner* — Insun Kang
(74) *Attorney, Agent, or Firm* — Fitzpatrick, Cella, Harper & Scinto

(57) ABSTRACT

An updating method for firmware that is stored as a file in an image forming apparatus that includes a file system that has a journaling function. The method comprises determining whether an update for the firmware is instructed, and determining to update the firmware when it is determined that the update is instructed; determining whether firmware for the update is stored in a storing unit when it is determined to update the firmware, and disabling the journaling function when the firmware for the update is stored in the storing unit; and updating the firmware by use of the firmware for the update in a state in which the journaling function is disabled.

11 Claims, 5 Drawing Sheets

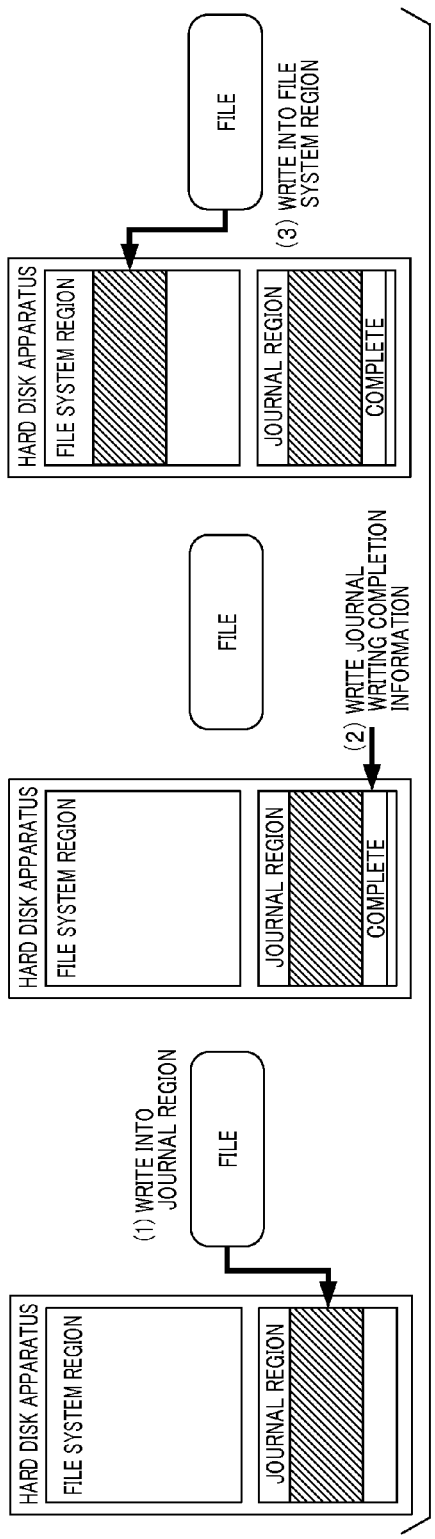
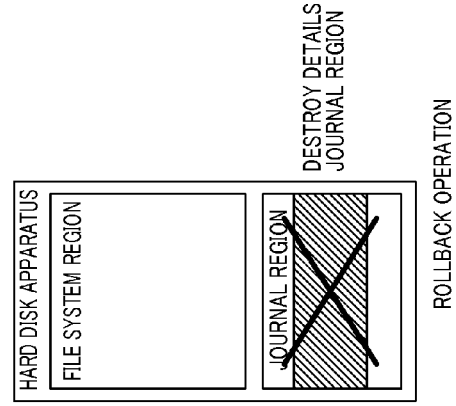
FIG. 4A  FILE WRITING OPERATION IN FILE SYSTEM INCLUDING JOURNALING FUNCTION
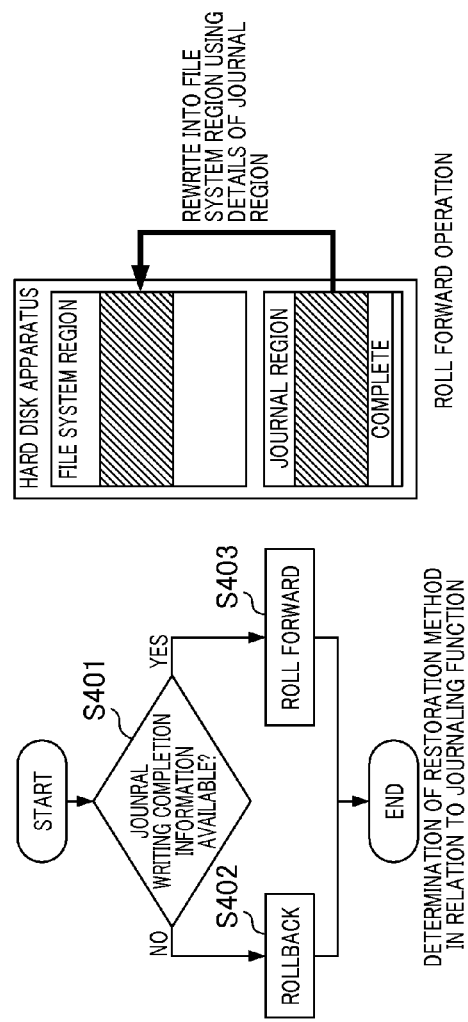
FIG. 4C  ROLL FORWARD OPERATION
FIG. 4D  ROLLBACK OPERATION
FIG. 4B  DETERMINATION OF RESTORATION METHOD IN RELATION TO JOURNALING FUNCTION

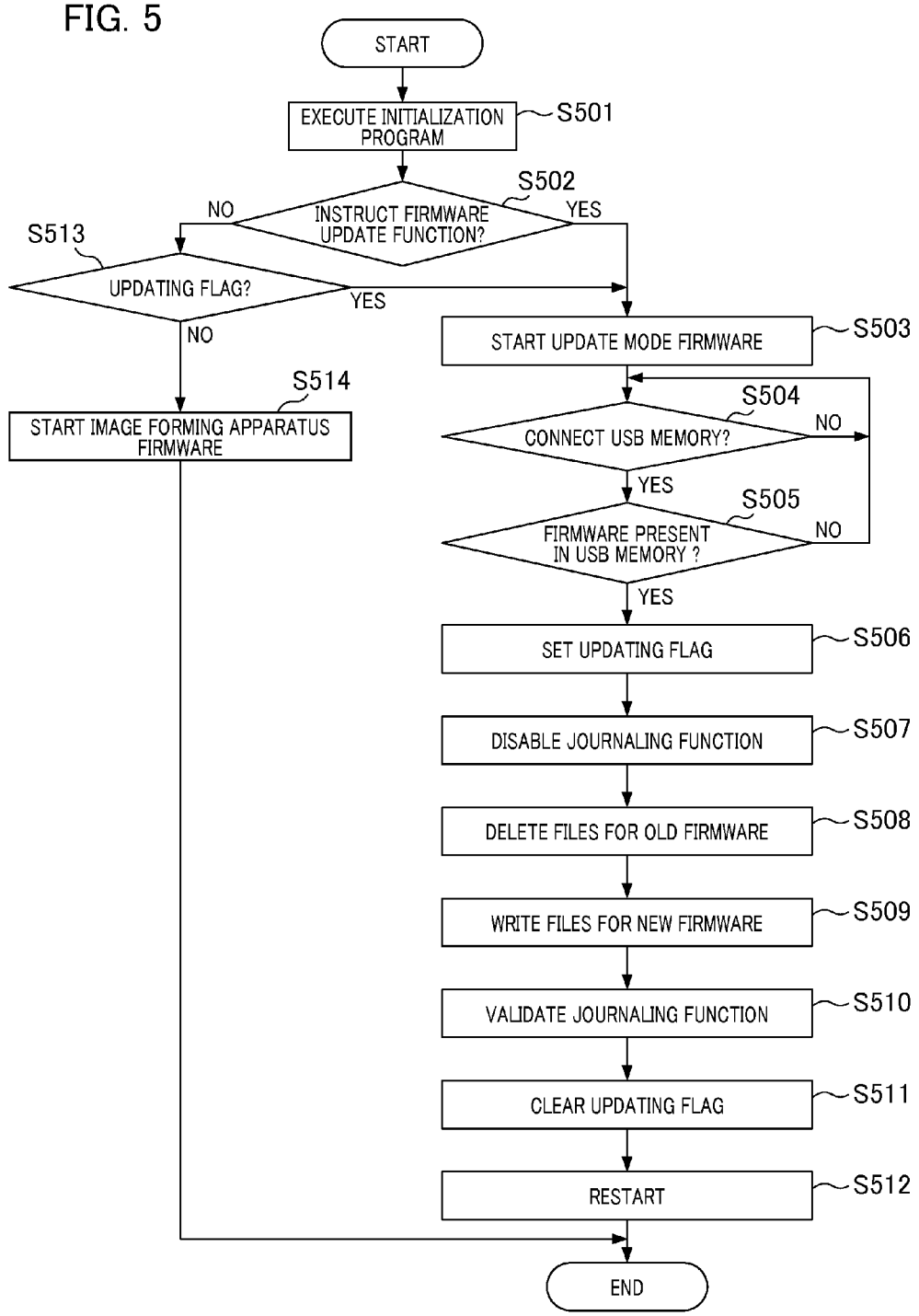

FIRMWARE UPDATING METHOD, IMAGE FORMING APPARATUS, AND STORAGE MEDIUM

BACKGROUND OF THE INVENTION

1. Field of the Invention

The present invention relates to a firmware updating method, an image forming apparatus, and a storage medium.

2. Description of the Related Art

An image forming apparatus has been proposed that is provided with a firmware updating function configured to enable updating of firmware for control of the image forming apparatus. The firmware updating function may require replacement of firmware on the image forming apparatus with new firmware for a purpose such as enhancing the functions of the image forming apparatus, or solving a failure.

However, it may be the case that during updating of the firmware, an unexpected power failure to the image forming apparatus may occur due to a reason such as a power outage or earthquake. When a power failure occurs, the writing of the new firmware may be terminated in a non-complete state with the result that the updating of the firmware fails. In this case, there is the possibility that the image forming apparatus may not be capable of restarting.

Typically, an image forming apparatus has been provided with the following configuration. That is to say, the image forming apparatus includes a second component of firmware that is separate to the firmware that is updated by the firmware updating function. Thereby, the image forming apparatus restarts the second firmware component when an update fails. The second firmware component of the image forming apparatus that includes such a configuration has the function for example of re-executing the firmware updating function. In this manner, the image forming apparatus can be restored from an update failure. For example, the communication apparatus disclosed in Japanese Patent Application Laid-Open No. 2004-318871 sets a flag after downloading of the firmware in order to indicate whether the rewrite of the firmware is current or complete. When the communication apparatus is restarted during the firmware rewrite, a recovery operation is executed. The communication apparatus disclosed in Japanese Patent Application Laid-Open No. 2004-318871 is applied as an image forming apparatus to thereby enable the image forming apparatus to re-execute an update during a restart even after failure of the firmware update.

Recent years has witnessed general availability of an image forming apparatus configured to store various types of data as files in a storage apparatus of the image forming apparatus by use of a file system in relation to management of firmware or image data. Firmware for an image forming apparatus that uses a file system is also stored in the storage apparatus as a file.

A journaling function is a general feature of recent file systems. A journaling function is a type of function configured to prevent occurrence of an abnormality due to a power failure in relation to a file system. However, a file system that includes a journaling function is associated with an impaired performance for file writing into the storage apparatus. That is to say, since time is required to write new firmware into a storage apparatus, the time required for firmware updating increases in a similar manner. Therefore, the burden on a user is increased since time is required in particular for updating of an image forming apparatus that includes large-scale firmware that is configured from a large number of files.

SUMMARY OF THE INVENTION

According to the method of updating firmware of the present invention, the time required for updating of firmware is reduced by updating firmware in a configuration under which the journaling function is disabled during the firmware update.

The firmware updating method according to an aspect of the present invention is a method for updating firmware stored as a file in an image forming apparatus that has a file system that includes a journaling function. The firmware updating method includes determining whether an update for the firmware is instructed, and determining to update the firmware when it is determined that the update is instructed, and determining to update the firmware when the update instruction is detected; determining whether firmware for the update is stored in a storing unit when it is determined to update the firmware, and disabling the journaling function when the firmware for the update is stored in the storing unit; and updating the firmware by use of the firmware for the update in a state in which the journaling function is disabled.

Further features of the present invention will become apparent from the following description of exemplary embodiments with reference to the attached drawings.

BRIEF DESCRIPTION OF THE DRAWINGS

FIG. 4A to 4D is a schematic diagram of a journaling function.

FIG. 5 is a flow diagram of a firmware update according to the present invention.

BRIEF DESCRIPTION OF THE EMBODIMENTS

Figure 1:
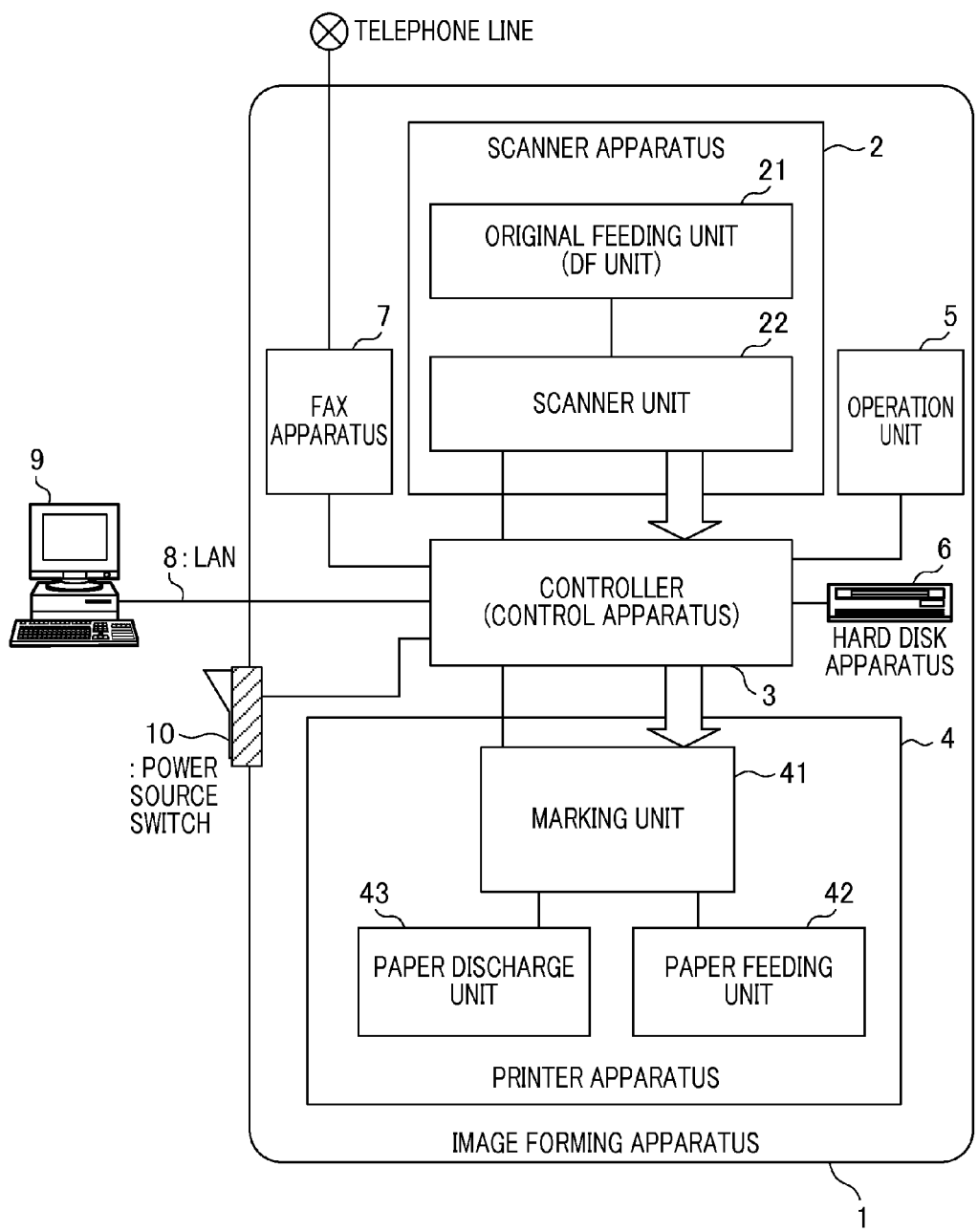
FIG. 1 illustrates a system block diagram of an image forming apparatus according to a first embodiment of the present invention.

FIG. 1 illustrates a configuration example of an image forming apparatus according to a first embodiment. The image forming apparatus 1 includes a scanner apparatus 2, a controller (control apparatus) 3, a printer apparatus 4, an operation unit 5, a hard disk apparatus 6, a FAX apparatus 7, and a power switch 10. The scanner apparatus 2 includes an original feeding unit (DF unit) 21, and a scanner unit 22. The printer apparatus 4 includes a marking unit 41, a paper feeding unit 42 and a paper discharging unit 43.

The scanner apparatus 2 performs optical reading of an image from a paper medium such as an original or the like, and converts the image to a digital image. The controller 3 executes a job on the image forming apparatus by outputting an instruction to the respective modules. The printer apparatus 4 outputs a digital image to a paper medium. The operation unit 5 that is configured to execute operations on the apparatus performs an operation on the image forming apparatus 1 upon receipt of an instruction from the controller 3. The hard disk apparatus 6 stores the digital image, firmware or the like that controls the image forming apparatus. The FAX apparatus 7 sends a digital image to a telephone line or the like. The image forming apparatus 1 executes instructions or the like in relation to a device, the issuance of a job, the input or output of a digital image from a computer for example through a network such as a LAN 8, or the like.

The original feeding unit 21 provided in the scanner apparatus 2 executes automatic sequential replacement of a stack of original documents. The scanner unit 22 executes optical scanning of the original documents and converts them to digital image data. The image data converted by the scanner unit is sent to the controller 3.

The paper feeding unit 42 provided in the printer apparatus 4 executes sequential feeding of individual sheets from the paper stack, and the marking unit 41 prints image data on the fed sheet. Furthermore, the paper discharging unit 43 provided in the printer apparatus 4 discharges a sheet after completion of printing.

The operation unit 5 includes an operation panel such as a liquid crystal screen or the like and an operation button (not illustrated) that provide a user with various types of information about the image forming apparatus 1 and enable a user to instruct the image forming apparatus 1 to execute an operation such as image reproduction.

The power switch 10 is a toggle-type switch such that a power source of the image forming apparatus 1 is switched ON and OFF in response to a user operation to the power switch 10.

The image forming apparatus 1 can execute a variety of jobs, and for example, includes the following functions.

Copy Function

The image forming apparatus 1 stores an image read by the scanner apparatus 2 in the hard disk apparatus 6 and simultaneously executes printing by the printer apparatus 4.

Image Sending Function

The image forming apparatus 1 sends an image read by the scanner apparatus 2 to a computer 9 through a LAN 8.

Image Storage Function

The image forming apparatus 1 stores an image read by the scanner apparatus 2 in the hard disk apparatus 6 and executes image sending or image printing as required.

Image Printing Function

The image forming apparatus 1 analyzes the page description language and the like that sent from the computer 9 executes printing by the printer apparatus 4.

Figure 2:
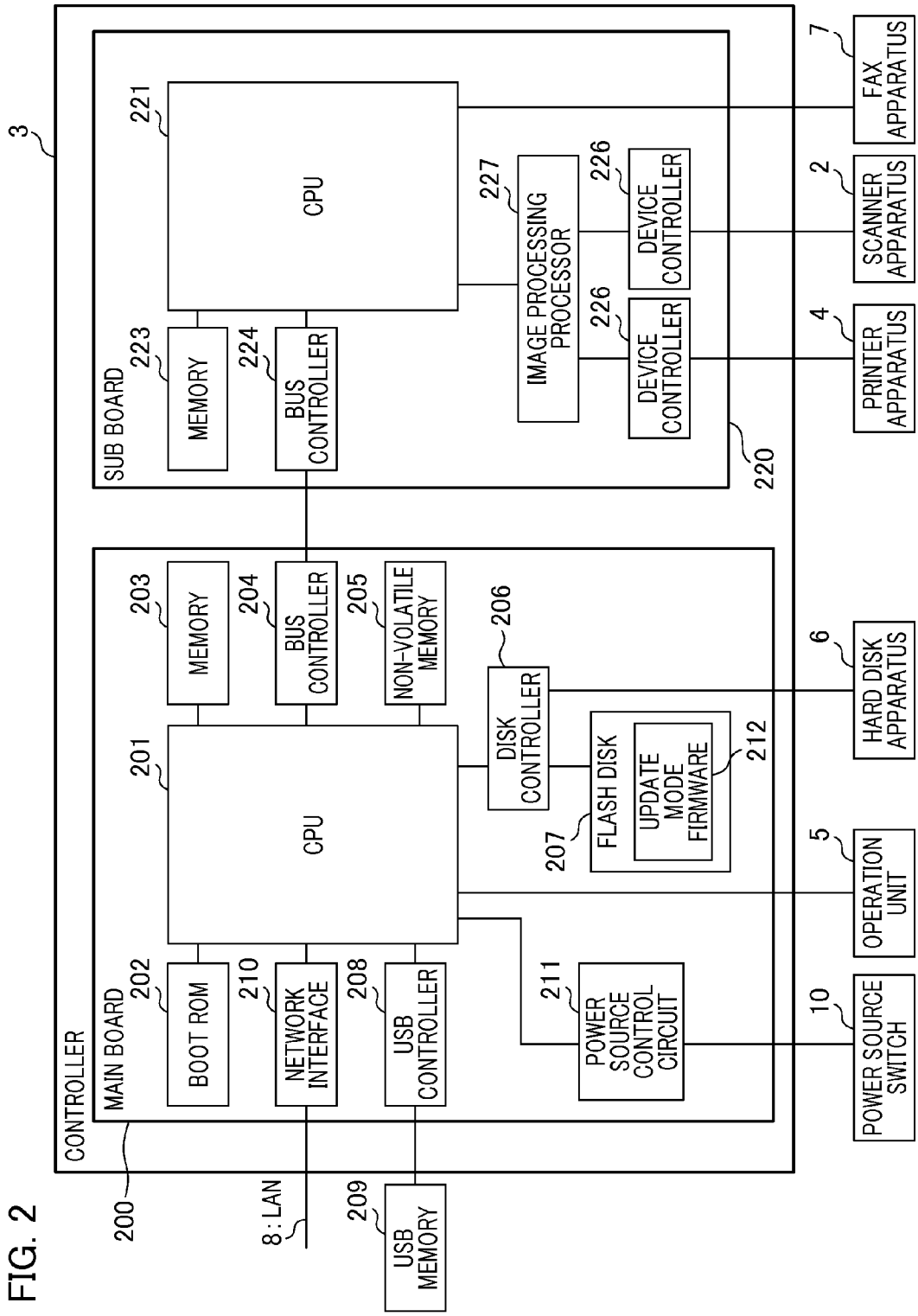
FIG. 2 is a block diagram of a control unit for an image forming apparatus.

FIG. 2 is a functional block diagram of a controller. A controller 3 that is a module actually applying the present invention will be described making reference to the figures. The controller 3 includes a main board 200 and a sub-board 220.

In the present embodiment, the main board 200 is a general purpose CPU system. The main board 200 includes a CPU 201 that performs overall board control, a boot ROM 202 including an initializing program (also termed BIOS), and a memory that is used as the principal storage memory by the CPU 201. The main board 200 includes a bus controller 204 that includes a bridging function to an external bus and a non-volatile memory 205 that retains information which is not deleted even when the power is cut off. The main board 200 also includes a disk controller 206 that controls the storage apparatus, a flash disk 207 (such as a SSD) that is a relatively small capacity storage apparatus configured by a semiconductor device, and a USB controller 208 that can control a USB memory 209. The flash disk 207 includes a program such as update mode firmware 212 or the like for updating firmware of the image forming apparatus stored in the hard disk apparatus 6 or the operating system (OS) operated by the CPU 201.

The main board 200 includes a power source control circuit 211. The power source control circuit 211 is configured to enable overall resetting of the controller 3 by controlling a reset circuit (not illustrated). The CPU 201 enables resetting of the controller 3 through the power source control circuit 211 and enables restarting of the image forming apparatus 1 in response to the reset.

The USB memory 209 that functions as an external storage apparatus, the operation unit 5, the hard disk apparatus 6 or the like are connected to an external unit of the main body 200. A LAN 8 is connected to the main board 200 through a network interface 210 so that mutual communication with a computer 9 or the like is realized.

The sub-board 220 is configured by a relatively small general-purpose CPU system and image processing hardware. The sub-board 220 includes a CPU 221 that executes overall control of the sub-board, a memory 223 that is used as a principal storage memory by the CPU 221, and a bus controller 224 that includes a bridging function with an external bus. The CPU 221 communicates with the CPU 201 through the bus controllers 224, 204. The sub-board 220 further includes a device controller 226 and an image processing processor 227 that executes real-time digital image processing.

The scanner apparatus 2, the printer apparatus 4 and the FAX apparatus 7 are connected to an external unit of the sub-board 220. The image processing processor 227 executes receipt and transfer of digital image data to the printer apparatus 4 and the scanner apparatus 2 through the device controller 226. Note that the CPU 221 executes direct control of the FAX apparatus 7.

A block view shown in FIG. 2 is configured to simplify the disclosure. For example, the CPU 201 and the CPU 221 includes a large number of CPU peripheral hardware components such as a chip set, bus bridge, clock generator, or the like. However, since such components are not required for clear description, although the disclosure has been simplified, the block configuration does not thereby limit the present invention.

The operation of the controller 3 will be described with reference to an example of image copy with the paper medium. When a user instructs an image copy via the operation unit 5, the CPU 201 sends the image read command to the scanner apparatus 2 through the CPU 221. The scanner apparatus 2 executes optical scanning of the original documents, converts the scanned original documents to digital image data, and inputs the data to the image processing processor 227 through the device controller 226. The image processing processor 227 executes DMA transfer of the data through the CPU 221 to the memory 223 to thereby execute temporary storage of the digital image data.

The CPU 201 confirms that a predetermined amount or all of the digital image data is stored in the memory 223, and outputs an instruction to output the image through the CPU 221 to the printer apparatus 4. The CPU 221 informs the image processing processor 227 of the image data positions of the memory 223. The CPU 221 sends image data in the memory 223 to the printer apparatus 4 through the device controller 226 and the image processing processor 227 in response to a synchronization signal from the printer apparatus 4. As a result of the above processing, the printer apparatus 4 prints digital image data on the paper medium.

When printing a plurality of copies, the CPU 201 causes the hard disk apparatus 6 to store image data from the memory 223. Therefore, the image can be sent to the printer apparatus 4 even in the absence of receipt of the image from the scanner apparatus 2 after the second copy.

Figure 3:
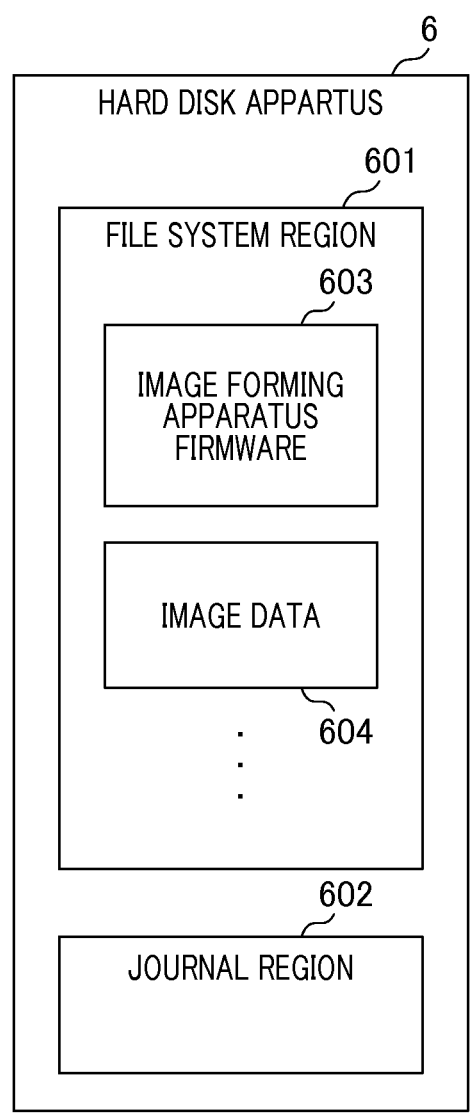
FIG. 3 is a configuration diagram of the storage details of a hard disk apparatus for an image forming apparatus.

FIG. 3 is a schematic view of the storage contents of the hard disk apparatus. The hard disk apparatus 6 is managed by a file system that is one of the functions of the OS of the image forming apparatus 1, and stores various types of data as a file in a separate configuration. The image forming apparatus according to the present invention uses a file system that includes a function terms a journaling function. The internal units of the hard disk apparatus 6 are partitioned and separated into two regions of a journal region 602 that is a first storage unit and a file system region 601 that is a second storage unit.

The file system region 601 is a region configured to store a file to be saved in the hard disk apparatus 6. Image forming apparatus firmware 603 that is executed by the CPU 201 in order to control the image forming apparatus, or image data 604 that is processed by the image forming apparatus are stored as a file in the file system region 601. The journal region 602 is a special region used internally by the file system.

Next, the journaling function will be described next. The journaling function is a function configured to prevent occurrence of an abnormality in the file system when a power failure occurs during file writing. When a power failure occurs during writing of a file into a hard disk apparatus in a file system that does not include a journaling function, writing is incomplete, and an abnormality may occur. For example, the abnormality may include only partial reading of a file that has been written, reading of contents that differ from the written contents or the like. The journaling function is a function for protecting a file from the occurrence of this type of abnormality, and executes automatic file restoration when writing becomes incomplete.

The use of a file system including a journaling function in relation to the image forming apparatus according to the present invention prevents an abnormal state of image data 604 that is stored in the hard disk apparatus 6 due to a power failure.

FIG. 4A to FIG. 4D illustrate the basic concept of a journaling function for a file system. FIG. 4A schematically illustrates the file writing operation in a file system that is provided with a journaling function. In a file system that is provided with a journaling function, the CPU firstly writes the details that are updated by writing of the file into a journal region of the hard disk apparatus 6 (FIG. 4A-(1)). When writing into the journal region 602 is completed, the CPU 201 writes journal writing completion information into the journal region 602 to indicate that writing into the journal region is completed (FIG. 4A-(2)). After completion of these processes, the CPU 201 writes the file into the file system region 601, and completes the file writing through this series of operations (FIG. 4A-(3)). The details of the journal region 602 are destroyed after completion of all processing steps. Generally, when compared with a file system that is not provided with a journaling function, a file system that includes a journaling function may generally be characterized by the feature that time is required for file writing due to the writing operation into the journal region.

FIG. 4B is a flowchart describing the restoration process that is automatically executed when a power failure occurs in a file system that is provided with a journaling function. After restoration of the power source, the CPU executes the processing steps illustrated in the flowchart.

In S401, the CPU 201 checks the journal region 602 of the hard disk apparatus 6, and checks whether or not the journal writing completion information has been written. When the journal writing completion information has not been written, it means that a power failure has occurred during the writing operation into the journal region 602, and therefore processing proceeds to S402. When the writing process has been performed, the processing proceeds to S403. In S402, the CPU 201 executes a roll back operation as illustrated in FIG. 4D. When the roll back operation is performed, the CPU 201 maintains the details of the file system region 601 prior to commencement of file writing by destroying the details that have been partially written into the journal region 601. When a power failure occurs during writing of a file into the file system region 601, the processing proceeds to S403. Then the CPU 201 executes the roll forward operation illustrated in FIG. 4C. When the roll forward operation is performed, the CPU 201 re-executes the file writing operation into the file system region 601 based on the details written into the journal region 602. In this manner, the CPU 201 executes proper completion of file writing. With the above operations, a file can be protected by a journal function even when an abnormality occurs as a result of a power failure.

Of course, FIG. 4A to FIG. 4D are for the purpose of illustrating a basic conceptual illustration of the journaling function, and the details of the actual operation may different in response to the individual mounting configuration of the file system. However, the present invention may be generally applied to an image forming apparatus using a journaling function, and is not limited to a configuration using a specific file system.

Next, a file updating method for a file system in an image forming apparatus applying the present invention will be described. FIG. 5 is a flowchart of the operation of the firmware updating function of the image forming apparatus according to the present invention. The image forming apparatus 1 according to the present invention is configured to start up the image forming apparatus 1 using firmware that has a designated firmware updating function when the firmware updating function is used. Furthermore, in general, a user that operates the firmware updating function is a member of the servicing personnel responsible for the maintenance of the image forming apparatus. The execution of the flow of operations is commenced on the CPU 201 when the user operates the power source switch 10 of the image forming apparatus 1 so as to make the power source ON state.

Firstly, in S501, the CPU 201 commences the execution of the initializing program stored in the boot ROM 202. The CPU 201 reads the OS from the flash device 207 into the memory 203, commences execution, and then the processing proceeds to S502.

A user can instruct execution of the firmware updating function by operation of the predetermined operation button on the operation unit 5 immediately after making the power source ON via the power source switch 10. In S502, the CPU 201 determines whether or not the user has instructed the execution of the firmware updating function. That is to say, the CPU 201 functions as a determination unit configured to determine whether an update for the firmware is instructed, and determines to update the firmware when it is determined that the update is instructed. When execution of the firmware update function is instructed, the processing proceeds to S503.

In S503, the CPU 201 reads the updating mode firmware 212 from the flash disk 207 into the memory 203 and starts up the firmware 212. In S504, the CPU 201 confirms whether or not the USB memory 209 is connected to the USB controller 208. When the USB memory 209 is not connected, the CPU 201 repeats the processing in the step S504 until connection is realized, or maintains the state in S504 until connection. When the USB memory 209 is connected, the processing proceeds to S505.

In S505, the CPU 201 confirms whether or not updating firmware for the image forming apparatus is stored in the USB memory 209. In the present embodiment, the updating firmware is stored in a storage memory that is installed in an external unit of the image forming apparatus 1, such as a USB or the like. Therefore, even during a power failure during the firmware update, the possibility of damage or deletion to the updating firmware itself is considerably reduced. When the firmware is not stored, the processing returns to S504, and when the firmware is stored, the processing proceeds to S506. In S506, the CPU 201 sets the updating flag that indicates that the firmware updating function is being executed in the non-volatile memory 205. That is to say, when the updating firmware is stored in the USB memory 209, the CPU 201 functions as a setting unit configured to set the state information that indicates current execution of the updating.

In S507, the CPU 201 functions as a disabling unit, and disable the journaling function of the file system. Although there is no limitation in relation to the disabling of the journaling function, the disabling is preferably executed after setting the updating flag as described above and before commencement of updating of the image forming apparatus firmware 603 in the hard disk apparatus 6.

The updating mode firmware 212 only provides a firmware updating function, and the image forming apparatus 1 does not perform an image forming operation during the execution of the firmware. There is no occurrence of writing into the hard disk apparatus 6 for a purpose other than updating of the firmware, and the image data is not rewritten. Therefore, an abnormality does not occur in relation to information such as the image data 604 even upon occurrence of a power failure. Only the image forming apparatus firmware 603 in the hard disk apparatus 6 cannot achieve the effect that prevents from an abnormality due to the journaling function as a result of stopping the journaling function.

In S508, in order to substitute the file for the image forming apparatus firmware 603 in the hard disk apparatus 6 with the new firmware, the CPU 201 deletes the originally stored image forming apparatus firmware 603, that is to say, the firmware prior to updating. In S509, the CPU 201 reads the image forming apparatus firmware from the USB memory 209, and writes the firmware as a file for the new image forming apparatus firmware into the hard disk apparatus 6. That is to say, the CPU 201 functions as an updating unit configured to update the firmware using updating firmware in a state under which the journaling function is disabled. The updating processing in which firmware is updated in a disabling state enables a reduction in the updating time in comparison to an updating processing that uses a journaling function.

When writing of the updating firmware is completed, the CPU 201 functions as a validating unit in S510, and validates the journaling function of the file system. In S511, the CPU 201 clears the updating flag from the non-volatile memory 205. The validation of the journaling function is preferably performed after total completion of writing of the new image forming apparatus firmware 603 and before clearing of the updating flag. That is to say, the CPU 201 functions as a deletion unit configured to delete the setting of the state information that indicates that the updating is currently being performed when the journaling function is validated. When the updating of the image forming apparatus firmware 603 in the hard disk apparatus 6 is completed, the CPU 201 automatically restarts the image forming apparatus 1. In S512, the CPU 201 resets the controller 3 through the power source control circuit 211 and restarts the image forming apparatus 1.

The CPU 201 re-executes the flow of operations in FIG. 5 from the start upon restarting of the image forming apparatus 1. At this time, a user does not instruct execution of the firmware updating function, and therefore in S502, the CPU 201 determines that the firmware is not updated, and the processing proceeds to S513. In S513, the CPU 201 confirms whether the updating flag is set. When the updating of the firmware is completed normally, since the updating flag is deleted, the CPU 201 determines that the updating is completed, and the processing proceeds to S514.

In S514, the CPU 201 reads the image forming apparatus firmware 603 from the hard disk apparatus 6 into the memory 203 and starts the firmware 603. In this manner, the image forming apparatus 1 starts the new updated firmware, and the various functions provided in the image forming apparatus 1 comes into a state in which job execution is enabled. Furthermore, the CPU 201 validates the journaling function when firmware updating completion is determined. When as described above, the updating of the firmware for the image forming apparatus 1 is completed, the CPU 201 manages the file system by use of the journaling function.

However, in reality, there is a slight possibility of occurrence of a power failure resulting from a power outage during execution of the firmware updating function. In this context, the processing in case where a power failure occurs during execution of the firmware updating function will be described.

After occurrence of the power failure, when a user operates a power source switch 10 and starts the image forming apparatus 1, the CPU 201 re-commences execution from the start of the flow of operations illustrated in FIG. 5. The following description will only describe the differences in the operation from the configuration described above in which the firmware updating is completed normally without occurrence of a power failure.

In S502, the CPU 201 determines whether or not the user has instructed execution of the firmware updating function. When a power failure has occurred, the user may provide an instruction, or the image forming apparatus 1 may perform the determination automatically. When the CPU 201 determines that the firmware will be updated, the processing proceeds to S503, and when updating is not performed, the processing proceeds to S513.

In S513, the CPU 201 confirms whether the updating flag is set. When there is a possibility that the occurrence of the power failure occurs during the updating of the image forming apparatus firmware 603, and that the file updating process is not totally completed, the updating flag is set. For this purpose, the CPU 201 determines that the firmware update has failed during the updating process, and the processing proceeds to S503.

In S503, the CPU 201 reads the updating mode firmware 212 from the flash disk 207 into the memory 203 to commence execution, and re-executes the firmware updating function. Even when a power failure occurs, execution without damage of the updating mode firmware 212 according to the present invention can be guaranteed. This is due to the fact that the updating mode firmware 212 is not updated by use of a firmware updating function, and furthermore is stored in a storage apparatus that is different from the hard disk apparatus 6, for example, a USB memory 209.

Thereafter, the new image forming apparatus firmware 603 can be normally written into the hard disk apparatus 6 by a subsequent execution of the updating processing of the firmware as described above. At this time, since the image forming apparatus according to the present invention writes a file in a state in which the journaling function is disabled, there is a possibility that an abnormality may be caused by a power failure in the image forming apparatus firmware 603 in the hard disk apparatus 6. However, even it is assumed that an abnormality occurs, since the CPU 201 executes the process of deleting the old firmware file in S508, the file in which the abnormality is generated is also deleted in the same process. Therefore, since the CPU 201 rewrites the new image forming apparatus firmware, the CPU 201 can correctly update the firmware even when a file is present as a result of the abnormality. That is to say, even when a power failure occurs during execution of the firmware updating function, normal updating of the firmware of the image forming apparatus 1 is enabled.

Furthermore, the processing in S506 may be configured by firstly deleting the setting for the updating flag, and resetting the flag, or by maintaining without change the updating flag detected by the CPU 201 in S513, and causing the processing to proceed to S507. In addition, it may be assumed that the power failure occurs during the processing between S510 and S511. In this situation, in S513, when the updating flag is set, since the journaling function has been validated, the CPU 201 disables the journaling function again in S507. In case where the power failure occurs in the processing up to S509, since the journaling function is disabled, the CPU 201 may maintain the disabling of the journaling function, or of course, may perform a further disabling in response to the default setting.

In the present embodiment, although the image forming apparatus firmware 603 in the hard disk apparatus 6 is configured as a single file, this configuration is merely exemplary. The firmware may be configured from a plurality of files, and the invention is not limited to the aforementioned configuration. When the firmware is configured from a plurality of files, the effect of a further considerable reduction in the updating time is enabled by disabling the journaling function.

As described above, when the firmware is updated in accordance with the firmware updating method according to the present invention, disabling of the journaling function enables a reduction in the time required for updating of the firmware. Furthermore, it is possible to detect the occurrence of the power failure during the update by the setting of the updating flag that indicates that the firmware updating function is currently being executed, and to execute normal completion of the updating of the firmware by re-execution of the update. Furthermore, the image forming apparatus of the present invention uses a journaling function during the period in which the firmware updating function is executed. That is to say, updating of files other than the file for the firmware is performed by use of the journaling function. In this manner, even during an updating process that uses a storage apparatus that is provided in the image forming apparatus itself, it is possible for example to obtain an effect of protecting image data in the hard disk apparatus, and of preventing the occurrence of an abnormality in the file resulting from a power failure.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132788 filed Jun. 12, 2012, which is hereby incorporated by reference herein in its entirety.

What is claimed is:

1. A method for updating firmware stored as a file in an image forming apparatus that includes a file system that has a journaling function, the method comprising the steps of:
   determining whether an update of the firmware is instructed, and determining to update the firmware when it is determined that the update is instructed;
   determining whether an updating firmware is stored in a storing unit when it is determined to update the firmware, and disabling the journaling function when the updating firmware is stored in the storing unit; and
   updating the firmware by use of the updating firmware in a state in which the journaling function is disabled.

2. The method according to claim 1 further comprising the steps of:
   setting state information indicating that the firmware is currently being updated;
   validating the journaling function when the update of the firmware is completed; and
   deleting the setting of the state information when the journaling function is validated.

3. The method according to claim 2, wherein, in the updating step, writing a file for the updating firmware is executed after deleting a file for the firmware before the updating.

4. The method according to claim 3, wherein, when it is determined that the update is not instructed, the method further comprises the steps of:
   determining to not update the firmware;
   determining whether the state information indicating that the firmware is currently being updated is set; and
   determining whether the update of the firmware has failed during updating when the state information indicating that the firmware is currently being updated is set, and
   when it is determined that the update of the firmware has failed during the update, the method further comprises the steps of:
      disabling the journaling function again; and
      rewriting a file for the updating firmware after deleting the file for the updating firmware during updating.

5. The method according to claim 1, wherein the storage unit is an external storage apparatus connected to the image forming apparatus.

6. An image forming apparatus that comprises a file system that includes a journaling function and is provided with a processor to function as:
   a determining unit configured to determine whether an update of the firmware stored as a file is instructed, and determine to update the firmware when it is determined that the update is instructed;
   a disabling unit configured to determine whether an updating firmware is stored in a storing unit when it is determined to update the firmware, and disable the journaling function when the updating firmware is stored in the storing unit; and
   an updating unit configured to update the firmware by use of the updating firmware in a state in which the journaling function is disabled.

7. The image forming apparatus according to claim 6, where the processor further functions as:
   a setting unit configured to set state information indicating that the firmware is currently being updated;
   a validating unit configured to validate the journaling function when the update of the firmware is completed; and
   a deleting unit configured to delete the setting of the state information when the journaling function is validated.

8. The image forming apparatus according to claim 7, wherein the updating unit executes writing a file for the updating firmware after deleting a file for the firmware before updating.

9. The image forming apparatus according to claim 8, wherein, when it is determined that the update is not instructed, the determining unit determines to not update the firmware, determines whether the state information indicating that the firmware is currently being updated is set, and determines whether the update of the firmware has failed during updating when the state information indicating that the firmware is currently being updated is set, and when the determining unit determines that the update of the firmware has failed during updating, the disabling unit again disables the journaling function and the updating unit rewrites a file for the updating firmware after deleting the file for the updating firmware during updating.

10. The image forming apparatus according to claim 6, wherein the storage unit is an external storage apparatus connected to the image forming apparatus.

11. A non-transitory storage medium on which is stored a computer program for making a computer execute a method for updating firmware stored as a file in an image forming apparatus that includes a file system that has a journaling function, the method comprising:

determining whether an update of the firmware is instructed, and determining to update the firmware when it is determined that the update is instructed;

determining whether an updating firmware is stored in a storing unit when it is determined to update the firmware, and disabling the journaling function when the updating firmware is stored in the storing unit; and updating the firmware by use of the updating firmware in a state in which the journaling function is disabled.

* * * * *